Figure 1:
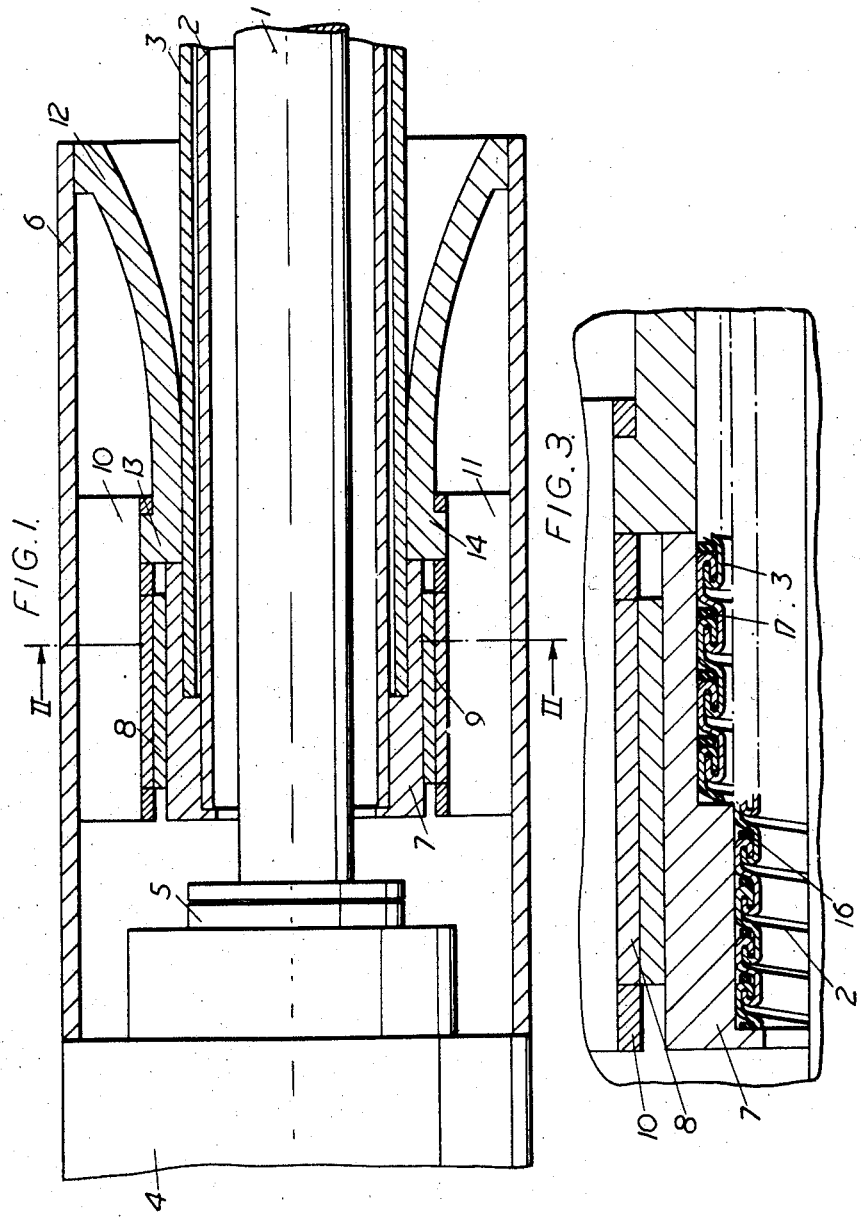

July 28, 1959　　　E. L. DAVEY ET AL　　　2,897,253
MECHANICAL PROTECTION OF ELECTRIC CABLES
Filed Oct. 6, 1953　　　　　　　　　　3 Sheets-Sheet 2

Inventors
Edward Leslie Davey &
William Young Murray
By
Attorneys

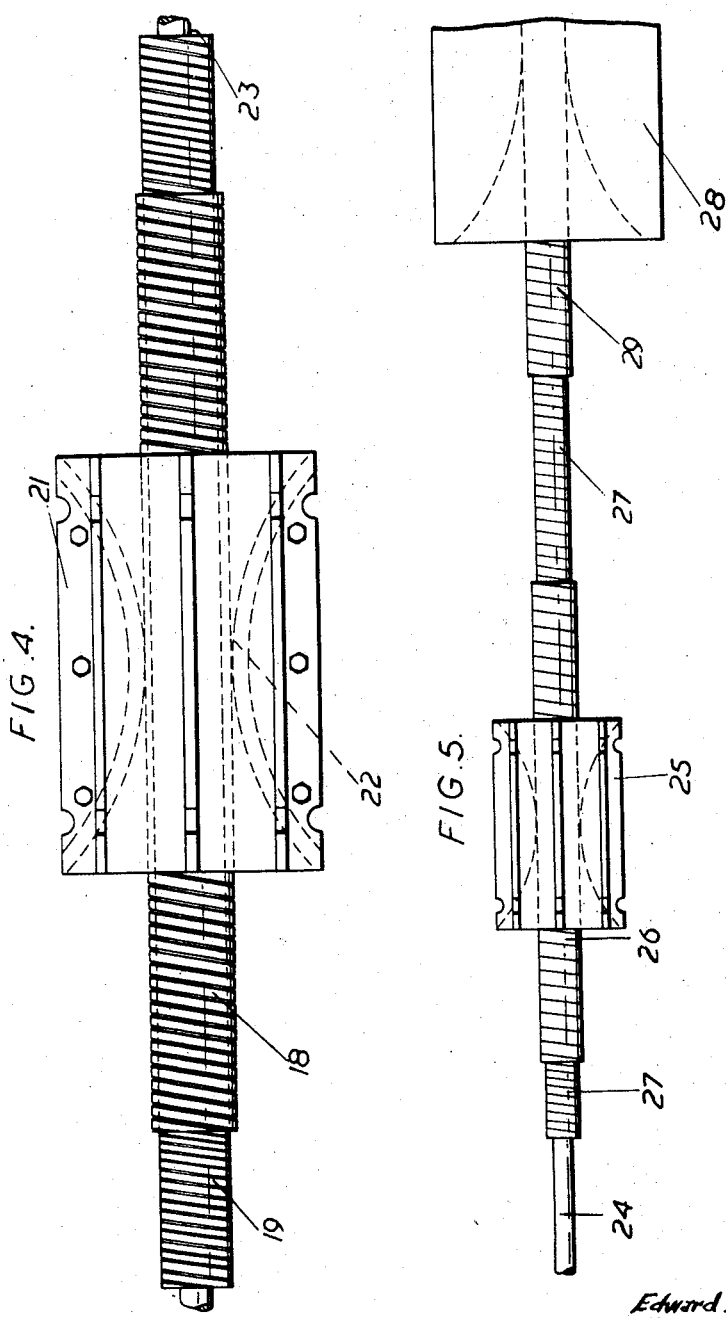

2,897,253

MECHANICAL PROTECTION OF ELECTRIC CABLES

Edward Leslie Davey, Hale, and William Young Murray, Prescot, England, assignors to British Insulated Callender's (Submarine Cables) Limited, London, England, a British company Application October 6, 1955, Serial No. 538,944

Claims priority, application Great Britain October 13, 1954

4 Claims. (Cl. 174—70)

This invention relates to submarine cables and in particular to means for preventing such a cable from undergoing severe local deformation where it enters a joint or other rigid accessory between two lengths of the cable or when it is being picked up or lowered by a rope attached to the cable at a joint or elsewhere.

In accordance with the invention we provide improved means for application to a submarine cable to prevent such severe local deformation. This improved means comprises a flexible sleeve through which the cable can be threaded and which can be positioned over the part where severe local deformation would otherwise be likely to occur. This sleeve comprises two or more nested lengths of tubing formed of interlocking helical turns of profiled metal strip, each of which lengths except the innermost is shorter than the underlying length or lengths so as to form a composite sleeve of stepped external diameter and varying flexibility. The form of the protective sleeve will depend upon whether it is required to protect from severe bending a part of the cable adjacent to a joint or rigid accessory or a part that is spaced therefrom. Where the lift is to be applied to the joint casing a pair of sleeves will be used one on each side of the joint. Each sleeve will be of stepped external diameter at one end only, namely, the end remote from the joint. The other end of the sleeve will be of maximum wall thickness and will be secured to the joint housing. In other cases the sleeve will be stepped at both ends and the lift applied to a part of the sleeve lying between its stepped ends. In some such cases one of the stepped ends of the sleeve may be coupled to the adjacent end of the neighbouring joint casing.

To provide for a more gradual change in flexibility of the sleeve, the extent to which each component tube of the sleeve is free to flex may be locally limited by inserting in some of the helical grooves between the interlocking turns of the profiled strip forming it, a wire or strip of appropriate section. Such a wire or strip may be held by welding or brazing it to the outer wall of the tube at its ends and, if required, at one or more intermediate points. Where the sleeve is to be stiffer at the middle than elsewhere, the inserted wire or strip will be located in the grooves of a central part of the outermost tube and/or in the grooves of a central part of an inner tube.

Where a still more gradual variation in flexibility of the sleeve is required an inserted wire or strip of which the cross section varies, either smoothly or in steps, from end to end of the wire or strip may be positioned in the grooves of one or more of the component tubes of the sleeve, the thicker end of the wire or strip being applied to the stiffer part of the sleeve.

Where the sleeve is to be attached at one end to a joint or other rigid accessory, the joint or accessory is preferably provided with a bell or flare mouth surrounding the adjacent part of the sleeve to limit the deformation of the attached end of the sleeve and of the cable within it. The other end of the joint or accessory is also preferably provided with a bell or flare mouth irrespective of whether there is an attached flexible sleeve or not. In the case of a sleeve that is stepped at both ends, a separate, double mouthed flare is preferably fitted on the central part of the sleeve.

The size of the sleeve will naturally depend upon the size and construction of the cable on which it is to be used.

Figure 2:
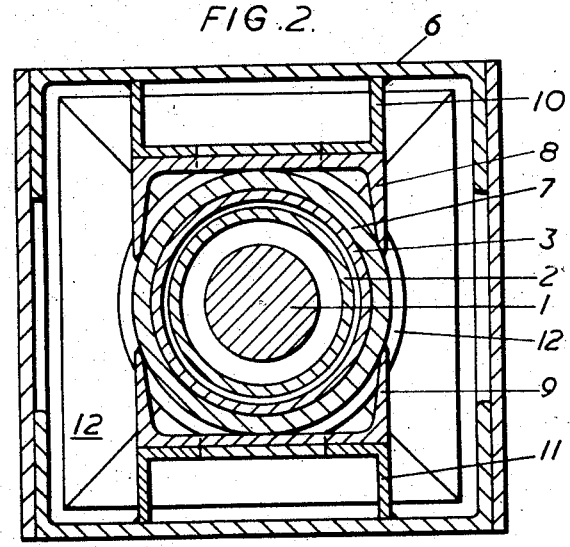

Examples of sleeves and submarine cable accessories incorporating them will be described with reference to the accompanying drawings in which Figures 1, 2 and 3 show a sleeve associated with a casing for a joint or other accessory, Figure 2 being a section on the line II—II of Figure 1 and Figure 3 being an enlarged detail of part of Figure 1, Figure 4 shows a device to which lifting tackle can be attached and Figure 5 shows the use of a special form of sleeve in conjunction with two devices.

Referring to Figures 1, 2 and 3, in which the same references are used for the same parts, a sleeve is shown as applied to a cable 1 which is a single core paper insulated, lead sheathed and wire armoured super-tension submarine cable having a diameter of approximately 4 inches. This sleeve comprises an 8 feet length of flexible steel tubing 2 made from profiled strip of 0.064 inch gauge metal, wound with a pitch of 0.75 inch and having an external diameter of 5.7 inches, surrounded by a 4 feet length of flexible steel tubing 3 made from profiled strip of 0.080 inch gauge metal and wound with a pitch of 1.0 inch. The outer tubing has an external diameter of 6.8 inches.

It will be seen from the drawing that the profiled strip from which each tube is made is generally of S-shaped cross-section, the strip being folded over at its edges to form marginal parts which are U-shaped in cross-section and which interlock with the similarly shaped edges of adjacent turns. This shaping provides positive interlocking between the turns and positively limits the arc through which the tube can be bent.

The sleeve formed by the tubes 2 and 3 is associated with a casing 4 of a joint or other accessory, which the cable enters through a gland 5. The tubes 2 and 3 are attached to a rectangular extension 6 of the casing 4 by means of a sleeve 7 into which they are soldered or welded. A pair of channel members 8 and 9 are welded to the sleeve 7 and these are carried by a further pair of channel members 10 and 11 which are welded to the extension 6.

A bell or flare member 12 fits (at its larger end) into the open end of the extension 6 and is supported at its inner end by the outer channel members 10 and 11. Opposed lugs 13 and 14 on the bell or flare member 12 fit into slots in the channel members 10 and 11.

The inner surface of the member 12 is throughout of circular cross-section and the outer surface is substantially square in cross-section at the larger end emerging to a circular cross-section at the smaller end (see Figure 3).

The flexibility of both tubes 2 and 3 at their fixed ends is reduced by positioning wires 16 and 17 in the helical grooves of the tubes to a length of 38 inches along the inner tube and to a length of 30 inches along the outer tube. These wires are of rectangular section measuring 0.1 inch x 0.2 inch in the case of the inner tube wire 16 and 0.125 inch x 0.25 inch in the case of the wire 17 in the outer tube.

Figure 4 shows a device for the protection of the same size of cable as shown in Figures 1–3 against severe local deformation where a lift is to be applied other than to the casing of a joint or other rigid accessory. In this device the sleeve consists of two tubes of the same size as those referred to in the description of the first example of sleeve. In this case however the outer tube 18 is positioned centrally on the inner tube 19 and a wire of rectangular section 0.125 inch x 0.25 inch is applied to the outer tube 18 only, to reduce the flexibility of the central part of it, for a length of 4 feet 6 inches. On the central part of the outer tube 18 is clamped a two-part rigid tubular member 21 around which the lifting slings may be passed. This member has a bore 22 which converges from each end towards a central throat which fits on to the outer tube 18 of the composite sleeve, the parts on each side of this central throat forming bell mouths which positively predetermine the minimum radius of curvature to which the central part of the sleeve, and hence of the cable 23 within it, may be subjected and reduce any tendency for the sleeve to buckle where it emerges from the rigid member 21.

Referring to Figure 5, this shows an arrangement in which a lifting device and a casing for a joint or other accessory are adjacent to each other on a cable 24.

The lifting device is similar to that shown in Figure 4 and comprises a central rigid member 25, an outer tube 26 and an inner tube 27 which extends at one end to form the inner tube of a sleeve associated with a casing 28, similar to the casing described with reference to Figures 1, 2 and 3. The end of the tube 27 and the end of an outer tube 29 enter an extension of the casing 28 and are anchored to it.

In general casings for joints or other accessories may be provided with the stepped sleeves of the invention at one or both ends in accordance with the conditions under which they are to be installed.

What we claim as our invention is:

1. A submarine cable having applied to it, for the purpose of preventing severe local deformation, a composite sleeve of stepped diameter and varying flexibility comprising two or more nested lengths of tubing formed of interlocking helical turns of profiled metal strip, the innermost length being of a diameter such that the cable can be threaded through it and the remaining lengths each being shorter than the underlying length, and an elongated metal member inserted in at least some of the helical grooves between the interlocking turns of the profiled strip of at least one of the lengths of tubing to make the change in flexibility of the sleeve from a maximum at the stepped end or ends to a minimum in the part of maximum diameter more gradual.

2. In combination a casing for a joint or other accessory of a submarine cable and a composite sleeve of varying flexibility for preventing severe deformation of the cable where it enters the casing comprising at least two nested lengths of tubing formed of interlocking helical turns of profiled metal strip each attached at one end to the casing, the innermost length being of a diameter such that the cable entering the casing can be threaded through it and the remaining lengths each being shorter than the underlying length and arranged so that the part of the sleeve projecting from the casing is of stepped diameter, and an elongated metal member inserted in at least some of the helical grooves between the interlocking turns of the profiled strip of at least one of the lengths of tubing to make the change in flexibility of the sleeve from a maximum at the free end to a minimum at the fixed end more gradual.

3. A composite sleeve of stepped diameter for application to a submarine cable to prevent severe local deformation comprising at least two nested lengths of tubing formed of positively interlocking helical turns of profiled metal strip, the innermost length being of a diameter such that the cable can be threaded through it and the remaining lengths each being shorter than the underlying length, and an elongated metal member inserted in at least some of the helical grooves between the interlocking turns of the profiled strip of at least one of the lengths of tubing to make the change in flexibility of the sleeve from a maximum in the part of minimum diameter to a minimum in the part of maximum diameter more gradual.

4. A device for application to a submarine cable to prevent severe local deformation at the point of attachment of lifting tackle comprising a sleeve of stepped diameter at both ends comprising at least two nested lengths of tubing formed of interlocking helical turns of profiled metal strip, the innermost length being of a diameter such that the cable can be threaded through it and the remaining lengths each being shorter than the underlying length, a rigid member adapted to receive the lifting tackle and attached to the central part of the outermost length of tubing and an elongated metal member inserted in at least some of the helical grooves between the interlocking turns of the profiled strip of at least one of the lengths of tubing to make the change in flexibility of the sleeve from each end to the point of attachment of said rigid member more gradual.

References Cited in the file of this patent

UNITED STATES PATENTS

| 996,899 | Witzenmann | July 4, 1911 |
|---|---|---|
| 1,699,911 | Palmer | Jan. 22, 1929 |
| 1,902,009 | Austin | Mar. 21, 1933 |
| 2,022,785 | Rollman | Dec. 3, 1935 |
| 2,697,739 | Presswell | Dec. 21, 1954 |

FOREIGN PATENTS

| 123,582 | Switzerland | Dec. 1, 1927 |
|---|---|---|
| 115,465 | Austria | Dec. 27, 1929 |
| 69,973 | Norway | Mar. 18, 1946 |